United States Patent
Raetzman et al.

(10) Patent No.: US 9,686,900 B2
(45) Date of Patent: Jun. 27, 2017

(54) CONVERTIBLE PINCH WHEEL CLOSING SYSTEM FOR AGRICULTURAL PLANTER

(71) Applicant: CNH Industrial America LLC, New Holland, PA (US)

(72) Inventors: Ryan R. Raetzman, Lemont, IL (US); Brian J. Anderson, Yorkville, IL (US); Johnathon R. Dienst, DeKalb, IL (US)

(73) Assignee: CNH Industrial America LLC, New Holland, PA (US)

( * ) Notice: Subject to any disclaimer, the term of this patent is extended or adjusted under 35 U.S.C. 154(b) by 64 days.

(21) Appl. No.: 14/788,216

(22) Filed: Jun. 30, 2015

(65) Prior Publication Data

US 2017/0000006 A1    Jan. 5, 2017

(51) Int. Cl.
| | |
|---|---|
| *A01B 61/04* | (2006.01) |
| *A01C 5/06* | (2006.01) |
| *A01B 49/06* | (2006.01) |
| *A01C 7/20* | (2006.01) |

(52) U.S. Cl.
CPC ............ *A01B 61/046* (2013.01); *A01B 49/06* (2013.01); *A01C 5/066* (2013.01); *A01C 5/068* (2013.01); *A01C 7/205* (2013.01)

(58) Field of Classification Search
CPC combination set(s) only.
See application file for complete search history.

(56) References Cited

U.S. PATENT DOCUMENTS

| | | | |
|---|---|---|---|
| 4,275,670 A | * | 6/1981 | Dreyer .................... A01C 5/06 111/136 |
| 4,398,478 A | | 8/1983 | Frase et al. |
| 4,493,274 A | | 1/1985 | Robinson, Jr. et al. |
| 4,528,920 A | | 7/1985 | Neumeyer |
| 4,721,048 A | | 1/1988 | Fuss et al. |
| 5,234,060 A | * | 8/1993 | Carter .................... A01C 7/205 172/260.5 |
| 5,497,714 A | | 3/1996 | Schlotthauer |
| 5,595,130 A | | 1/1997 | Baugher et al. |
| 5,619,939 A | | 4/1997 | Herman et al. |
| 5,724,902 A | | 3/1998 | Janelle et al. |

(Continued)

FOREIGN PATENT DOCUMENTS

| | | |
|---|---|---|
| WO | 2008/008345 A2 | 1/2008 |
| WO | 2013/049198 A1 | 4/2013 |
| WO | 2014/066650 A1 | 5/2014 |

OTHER PUBLICATIONS

"Yield-Pro Planters, Seed Placement", planter catalog from Great Plains Manufacturing, Inc., 2014 (28 pages).

(Continued)

*Primary Examiner* — Alicia Torres
(74) *Attorney, Agent, or Firm* — Rebecca L. Henkel; Rickard K. DeMille

(57) ABSTRACT

An agricultural planting apparatus includes a chassis, and a row unit having a unit body carried by the chassis. The unit body includes a metering device, at least one furrowing disc, a biasing element selected from at least one of the following: an extension spring, a compression spring, and a cylinder. A pair of pinch wheels are also carried by the unit body and includes an axle assembly pivotally movable relative to the unit body and connected to the biasing element. The axle assembly is configured to readily connect to at least one biasing element.

11 Claims, 6 Drawing Sheets

(56) References Cited

U.S. PATENT DOCUMENTS

| | | |
|---|---|---|
| 5,727,638 A | 3/1998 | Wodrich et al. |
| 5,809,873 A | 9/1998 | Chak et al. |
| 6,502,644 B2 | 1/2003 | Steinlage et al. |
| 6,615,753 B1 | 9/2003 | Culley |
| 6,709,522 B1 | 3/2004 | Condrashoff et al. |
| 6,848,377 B2 | 2/2005 | Rylander et al. |
| 7,040,331 B2 | 5/2006 | Garman et al. |
| 7,178,534 B2 | 2/2007 | Garman et al. |
| 7,308,859 B2 | 12/2007 | Wendte et al. |
| 7,360,494 B2 | 4/2008 | Martin |
| 7,426,893 B2 | 9/2008 | Wendte et al. |
| 7,438,006 B2 | 10/2008 | Mariman et al. |
| 7,520,338 B2 | 4/2009 | Stokes |
| 7,530,363 B2 | 5/2009 | Garman |
| 7,775,293 B2 | 8/2010 | Stokes |
| 7,784,416 B2 | 8/2010 | Thompson et al. |
| 7,870,826 B2 | 1/2011 | Bourgault et al. |
| 8,235,134 B2 | 8/2012 | Schilling |
| 8,275,525 B2 | 9/2012 | Kowalchuk et al. |
| 8,286,566 B2 | 10/2012 | Schilling et al. |
| 8,356,641 B2 | 1/2013 | Marelin et al. |
| 8,380,356 B1 | 2/2013 | Zielke et al. |
| 8,448,717 B2 | 5/2013 | Adams et al. |
| 8,474,546 B2 | 7/2013 | Schilling |
| 8,479,670 B2 | 7/2013 | Schilling et al. |
| 8,522,889 B2 | 9/2013 | Adams et al. |
| 8,555,798 B2 | 10/2013 | Schilling et al. |
| 8,863,857 B2 | 10/2014 | Bassett |
| 2007/0146480 A1 | 6/2007 | Judge, Jr. et al. |
| 2011/0313575 A1 | 12/2011 | Kowalchuk et al. |
| 2012/0255475 A1 | 10/2012 | Mariman et al. |
| 2013/0112123 A1 | 5/2013 | Turko et al. |
| 2013/0112124 A1 | 5/2013 | Bergen et al. |
| 2013/0206431 A1 | 8/2013 | Freed |
| 2013/0248214 A1 | 9/2013 | Adams et al. |
| 2013/0319698 A1 | 12/2013 | Adams et al. |
| 2013/0325267 A1 | 12/2013 | Adams et al. |
| 2014/0224513 A1 | 8/2014 | Van Buskirk et al. |

OTHER PUBLICATIONS

"A Time for Great Yields", The Progressive Farmer, Dec. 2011 (25 pages).

"Planters", catalog for Kinze, 2013 (60 pages).

* cited by examiner

CONVERTIBLE PINCH WHEEL CLOSING SYSTEM FOR AGRICULTURAL PLANTER

BACKGROUND OF THE INVENTION

1. Field of the Invention

The present invention relates to agricultural planters, and, more particularly, to agricultural planter row units.

2. Description of the Related Art

Agricultural planters are commonly used implements to plant seeds in soil. An agricultural planter can include a chassis that carries one or more storage tanks carrying seed, and chemical applications that are to be applied to the field during the planting operation, a hitch mechanism that attaches to a tractor or other implement pulled by a tractor, and a tool bar that row units can be connected to so they are carried by the chassis. The planter can also include a pneumatic system carried by the chassis that supplies pressurized air to transport the seeds or other particulate from the storage tanks to the row units.

Each row unit of the agricultural planter places seeds in the field. Typically, the row units are laterally arranged along a length of the tool bar so that as the planter is pulled across the field, each row unit plants seeds at predefined intervals along the path it is pulled across. To plant seeds, the row units perform three main operations as they are pulled: opening a trench in the soil; placing a seed into the formed trench at appropriate intervals; and closing the formed trench to put soil on top of the placed seed. To open a trench in the soil, a furrowing disc system, which may include an opening disc, cuts into the soil and rotates, dislocating soil as it rotates to form the trench. Once the trench is open, a seed is placed in the trench by a metering device which receives seeds from the main storage tank(s) or a row unit storage tank and typically utilizes a combination of differential air pressure, to select the seed, and gravity to place the seed in the trench at predefined intervals along the pulled path so that adjacent seeds in the row are not too close to one another. Pinch wheels carried behind the furrowing disc are pressed into the soil and also rotate as the planter is pulled to replace soil dislocated by the furrowing disc in the trench or dislocate adjacent soil into the trench to cover the seed placed in the trench with soil, as well as pack the soil onto the seed to provide good soil contact. By having multiple row units working in unison as the planter is pulled across a field, many seeds can be effectively planted in an efficient manner.

As the row unit is pulled across the field, a down force is typically applied to the pinch wheels to force the pinch wheels into the soil so that the pinch wheels maintain constant soil contact. The down force can be provided by, for example, a pneumatic cylinder or various types of springs. As farmers try to plant at different times in the season, conditions for closing the formed trench can change. When planting early in the season, for example, difficult soil conditions can require additional down force be applied to the pinch wheel(s) compared to conditions later in the season. A pneumatic cylinder allows the farmer to apply the required down force for early planting, but is typically more expensive and complicated compared to other elements that can provide down force to the pinch wheel(s), such as an extension or compression spring. Further, pneumatic cylinders require more components than springs, such as relatively heavy air compressors, which can add to the weight of the row unit and provide more possible failure points.

What is needed in the art is a way to apply downforce to the pinch wheels while overcoming some of the aforementioned disadvantages.

SUMMARY OF THE INVENTION

The present invention provides an agricultural planter with a row unit having pinch wheels which include an axle assembly that can connect to a variety of biasing elements to provide downforce to the pinch wheels.

The invention in one form is directed to an agricultural planting apparatus including a chassis; and a row unit carried by the chassis. The row unit includes a unit body carried by the chassis; a metering device carried by the unit body; at least one furrowing disc carried by the unit body; a biasing element carried by the unit body that is selected from the group consisting of an extension spring, a compression spring, and a cylinder; and a pair of pinch wheels carried by the unit body behind the at least one furrowing disc and including an axle assembly pivotally movable relative to said unit body and connected to said biasing element. The axle assembly is configured to readily connect to any of the group members of the biasing element.

The invention in another form is directed to a closing assembly for an agricultural planting apparatus that includes a mounting body; a biasing element connected to the mounting body that is selected from the group consisting of an extension spring, a compression spring, and a cylinder; and a pair of pinch wheels including an axle assembly pivotally connected to the mounting body and connected to the biasing element. The axle assembly is configured to readily connect to any of the group members of the biasing element.

An advantage of the present invention is that different biasing elements can be connected to the axle assembly to apply down force to the pinch wheels.

Another advantage is that relatively few components need to be switched out to change the type of biasing element connected to the axle assembly, simplifying the changing procedure and reducing cost.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention and such exemplification is not to be construed as limiting the scope of the invention in any manner.

DETAILED DESCRIPTION OF THE INVENTION

Figure 1:
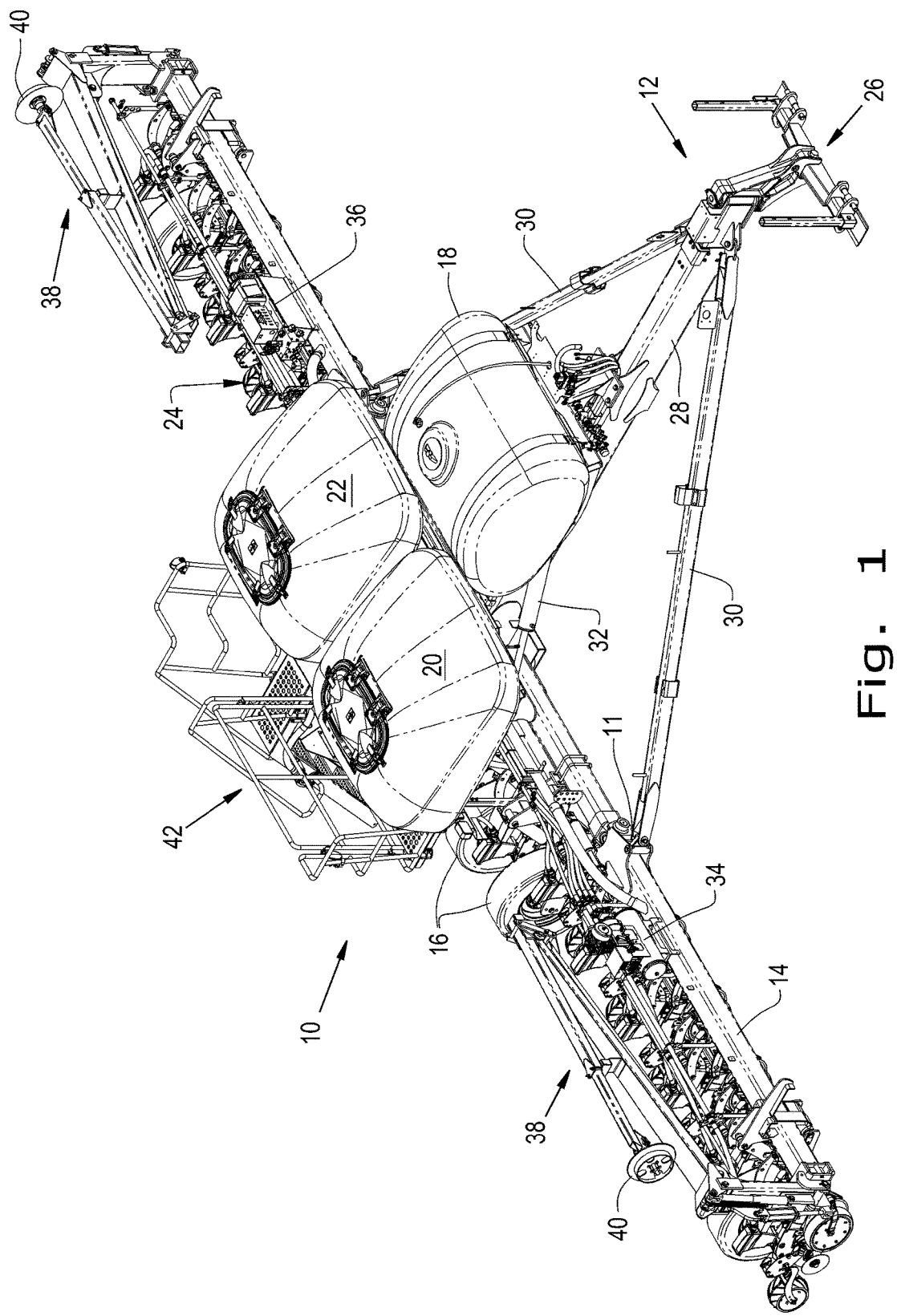
FIG. 1 is a perspective view of an embodiment of an agricultural planter according to the present invention.

Referring now to the drawings, and more particularly to FIG. 1, there is shown an embodiment of an agricultural planter 10 according to the present invention which generally includes a chassis 11 forming a support structure for components of the planter 10. The planter 10 can include a hitch assembly 12 at a front of the planter 10 connected to a tool bar 14 to form the chassis 11, main wheels 16 carried by the chassis 11 near a rear of the planter 10, one or more storage tanks 18, 20, 22 carried by the chassis 11 that can be filled with seed or other agriculture material, and a plurality of row units 24 connected to the tool bar 14 and arranged laterally across a length of the tool bar 14 so that they are carried by the chassis. The hitch assembly 12 can include a hitch 26 configured to be connected to a tractor or other agricultural implement (not shown) so that the planter 10 can be pulled in a forward direction of travel. The hitch 26 can be integrally formed with or connected to a hitch bar 28 that is connected to the tool bar 14 by bracing bars 30 and one or more cylinders 32. As can be seen throughout FIG. 1, the planter 10 can also have various hydraulic, pneumatic, and electrical lines (unnumbered) throughout to support various cylinders and systems that are included on the planter 10, such as a pneumatic system 34 connected to the tool bar 16 and an electric generator 36 also connected to the tool bar 16. A marking device 38 can be connected to each lateral end of the tool bar 14 and extendable so that a marking disc 40 of the marking device 38 can create a line in the soil as the planter 10 is pulled that helps a user in positioning the planter 10 to create subsequent rows. A stair assembly 42 can be mounted to the back of the planter 10 to allow an operator to access the storage tanks 20 and 22.

Figure 2:
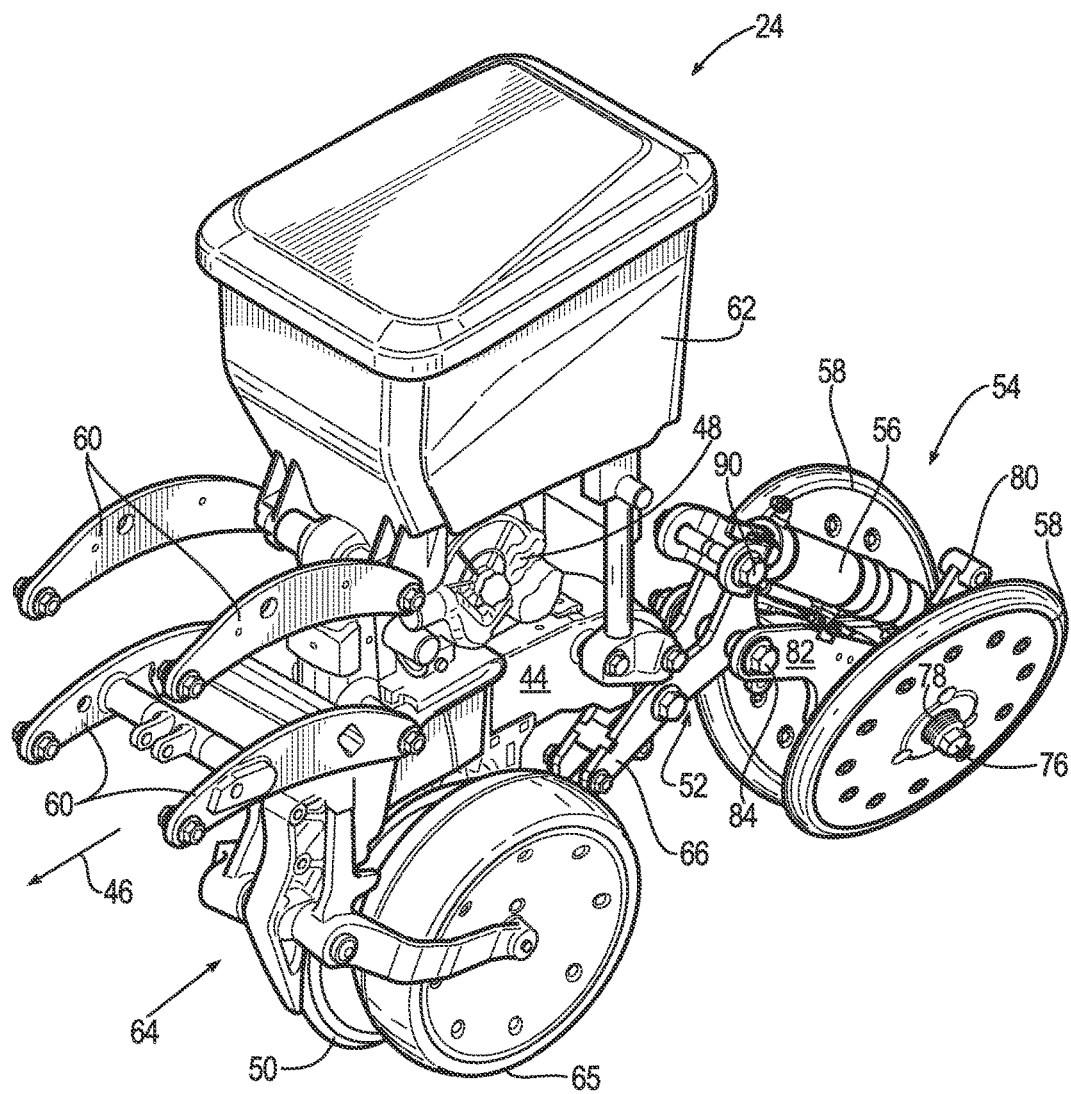
FIG. 2 is a perspective view of an embodiment of a row unit according to the present invention.

Referring now to FIG. 2, an embodiment of an individual row unit 24 is shown that is not connected to the tool bar 14. As can be seen, the row unit 24 generally includes a unit body 44 that can be carried by the chassis 11 in a direction of travel, signified by arrow 46, a metering device 48 carried by the unit body 44, a furrowing disc 50 connected to the unit body 44, and a closing assembly 54 carried by the unit body 44 that can include a mounting body 52 connected to the unit body 44, a biasing element 56 connected to the mounting body 52, and a pair of pinch wheels 58 carried behind the furrowing disc 50 by connection to the mounting body 52. As can be seen, the unit body 44 can have toolbar connecting arms 60 bolted thereon that can be connected to the chassis 11 in a parallel linkage arrangement so that the row unit 24 can be carried by the chassis 11 in the direction of travel 46. In this sense, the unit body 44 acts as a row unit chassis to keep the various components of the row unit 24 together during operation.

The metering device 48 carried by the unit body 44 is configured to receive seed from a unit storage tank 62 (also known as a mini-hopper) that is carried by the unit body 44 and can connect to one or more of the main storage tanks 18, 20 or 22. For ease of illustration, the electrical and pneumatic lines that would normally be connected to the metering device 48 have been omitted. The metering device 48 can be configured as any type of device which is capable of controllably metering out seeds to be planted by the row unit 24 during operation of the planter 10. For example, the metering device 48 can utilize a metering wheel (not shown) in combination with a vacuum formed in the metering device 48 to selectively pull seeds into a seed drop (not shown), where the vacuum is released and gravity causes the seed to drop into soil below. Other types of metering devices are known and could readily be adopted into the row unit 24 of the present invention.

The furrowing disc 50 carried by the unit body 44 presses into the soil and rotates as the planter 10 travels along a field, displacing soil in the field to form a trench. The furrowing disc 50 can have any type of construction that allows for it to rotate as it is carried along the field to form a trench in the soil, such as the annular disc shape shown. While only one furrowing disc 50 is shown, it is contemplated that two furrowing discs can be included in the row unit 24. Many different types of furrowing disc constructions are known and could be included in the row unit 24. Optionally, the furrowing disc(s) 50 can be connected to the unit body 44 by a furrowing suspension assembly 64 including one or more adjustable gauge wheels 65 that are configured to adjust the depth of the trenches formed by the furrowing disc(s) 50 as the planter 10 travels along the field. Any suitable furrowing suspension assembly can be used to connect the furrowing disc(s) 50 to the unit body 44.

Figure 3:
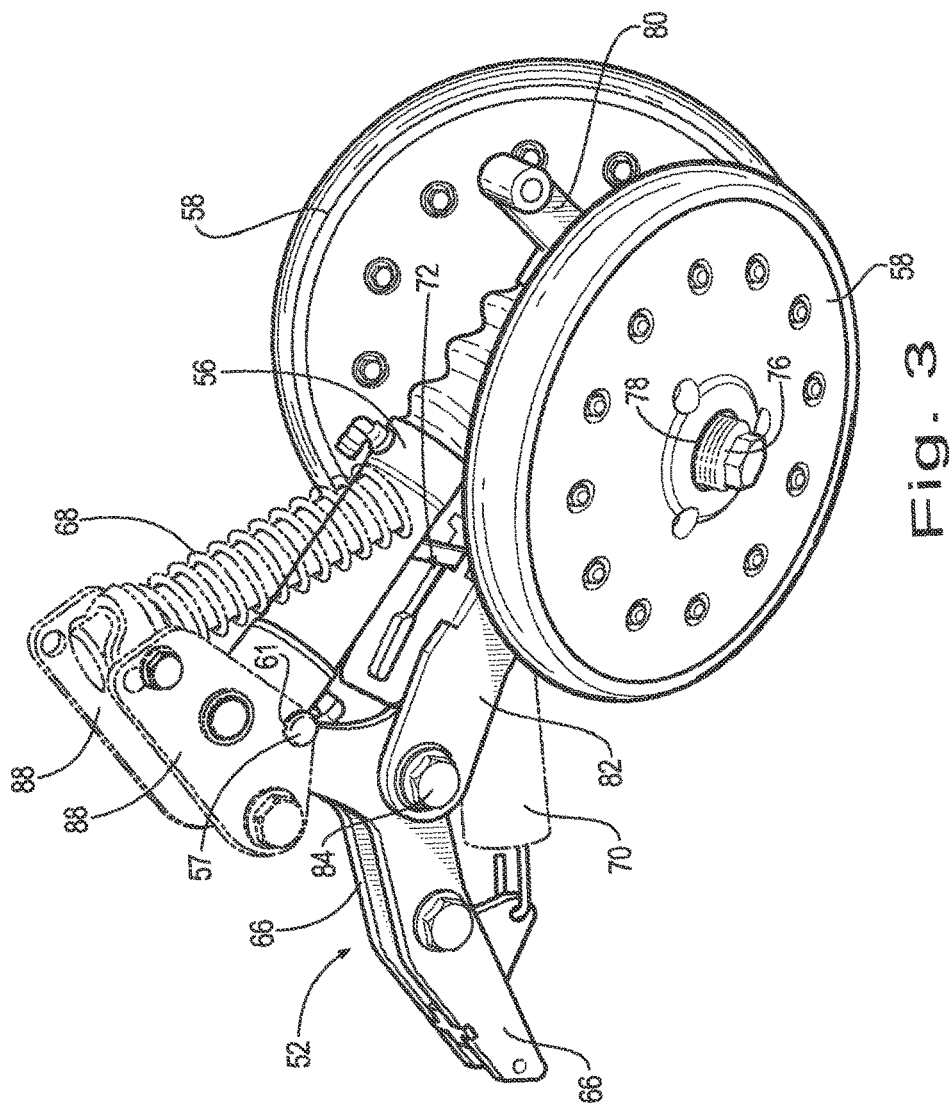
FIG. 3 is a perspective view of a closing assembly shown in FIG. 2 disconnected from the row unit.

Referring specifically now to FIG. 3, the closing assembly 54 is shown separately from the rest of the row unit 24. It should therefore be appreciated that the closing assembly 54 can be included as a part of the row unit 24 initially, or retrofitted to the row unit 24.

The mounting body 52 can be bolted to the unit body 44, as shown in FIG. 2, so that it can carry the connected biasing element 56 and pinch wheels 58 with the unit body 44 as the planter 10 travels across the field. The mounting body 52 can be a pair of connected plates 66 with a space formed between the plates 66, as shown, or any other suitable construction. The profile and mounting angle of the mounting body 52 can be adjusted to cover adjacent assemblies or parts, as desired.

Figure 4:
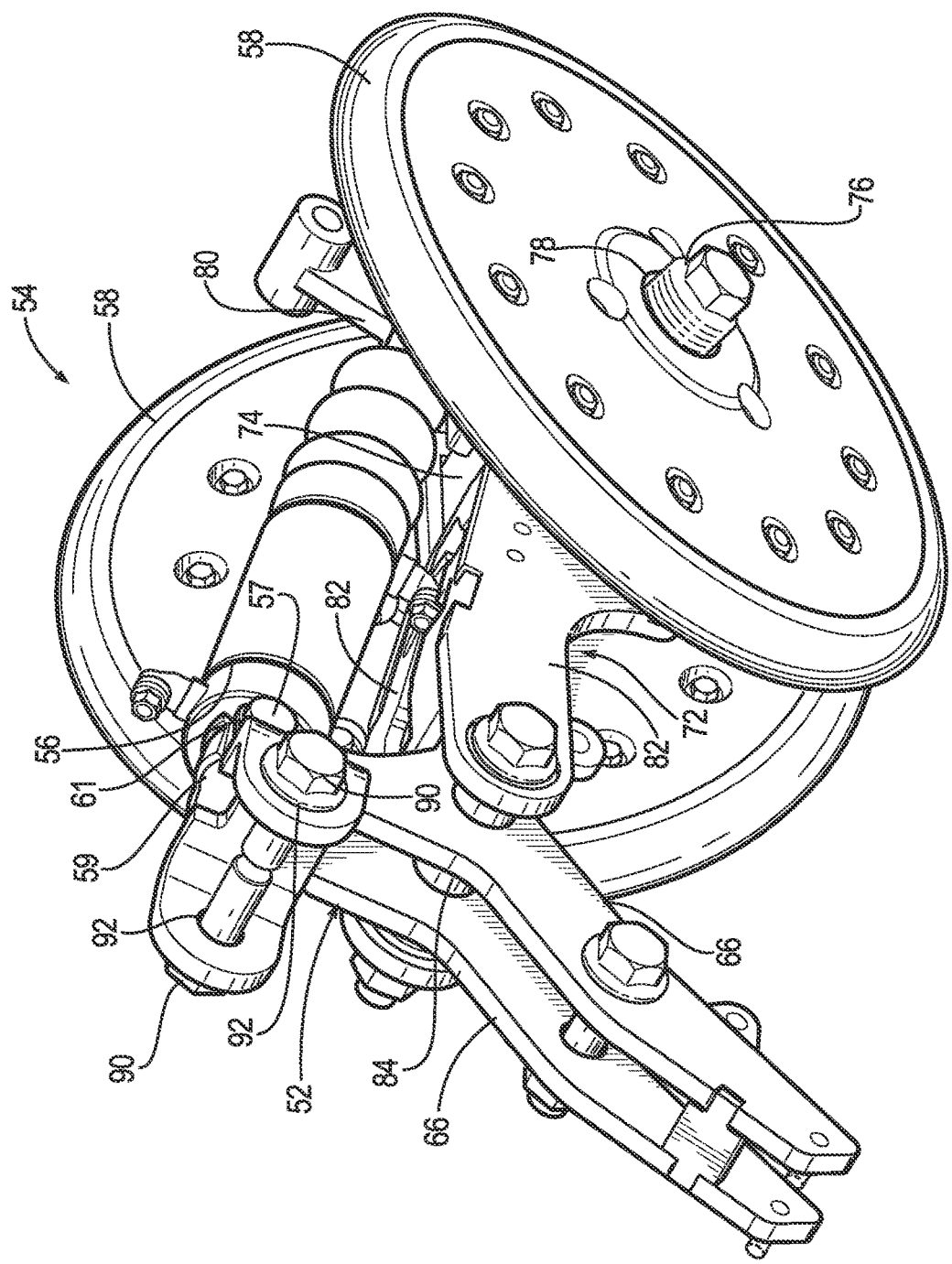
FIG. 4 is a perspective view of the closing assembly shown in FIGS. 2-3 with a biasing element shown only as a cylinder.

The biasing element 56, shown as a solid line pneumatic cylinder in FIGS. 2-4, is carried by the unit body 44 and connects to an axle assembly (not shown in FIG. 3) of the pinch wheels 58, which will be described further herein, to bias the pinch wheels 58 toward the ground as the row unit 24 is carried across the field. The biasing element 56 can be connected to the mounting body 52, as shown, or otherwise associated with the unit body 44 so that the biasing element 56 is carried by the unit body 44 during operation of the planter 10. The biasing element 56 can also be directly connected to the unit body 44, if desired. While the biasing element 56 is shown in FIG. 3 as a pneumatic cylinder, a hydraulic cylinder can also be used as the biasing element 56. In FIG. 3, three different possible biasing elements that can be part of the closing assembly 54 are shown: a pneumatic cylinder 56 drawn in solid lines, a compression spring 68 drawn in broken lines, and an extension spring 70 drawn in broken lines. The compression spring 68 and extension spring 70 are illustrated in FIG. 3, as well as pneumatic cylinder 56, to demonstrate how the springs 68 and 70 can be connected to the pinch wheels 58 and mounting body 52, but in use only one of the biasing elements 56, 68 and 70 is likely to be connected to the pinch wheels 58 at a time, although it is contemplated that two or all three of the biasing elements 56, 68 and 70 can be connected to the pinch wheels 58 at the same time. As shown in FIG. 3, the pneumatic cylinder 56 can be connected to the mounting body 52 by one or more pins 57 extending through one or more openings (not seen) formed at an end 59 of the pneumatic cylinder 56 and one or more openings 61 formed in the mounting body 52 defining a mounting feature. It should be appreciated that any type of mounting feature can be included on the mounting body 52 to connect the pneumatic cylinder 56 to the mounting body 52.

As shown, the pinch wheels 58 are configured as a pair of wheels 58 that are angled relative to one another so that the pinch wheels 58 converge toward a pinching area. As the row unit 24 is carried across the field, the pinch wheels 58 are carried behind the furrowing disc 50 in the direction of travel 46 and "pinch" soil adjacent to the trench formed by the furrowing disc 50 together, closing the trench and placing soil on top of a seed placed in the trench. The size of the pinching wheels 58 and the angle at which the wheels 58 are held relative to each other can be adjusted in any suitable way that allows the pinch wheels 58 to close the formed trench as the row unit 24 is carried across the field.

Referring now to FIG. 4, the closing assembly 54 is shown with only the pneumatic cylinder 56 connected to an axle assembly 72 of the pinch wheels 58 so that the pneumatic cylinder 56 can provide down force to the pinch wheels 58 through the axle assembly 72. The axle assembly 72 can have a main section 74 that connects to both pinch wheels 58, allowing the pinch wheels 58 to be carried together along with the axle assembly 72. The pinch wheels 58 can be connected to the main section 74 by axle bolts 76 placed through openings 78 of the pinch wheels 58 so that the pinch wheels 58 can be connected to the main section 74 without preventing rotation of the pinch wheels 58 as the row unit 24 is carried across the field. The pneumatic cylinder 56 can be connected to the main section 74 by a first biasing connection feature 80, shown as a connection bar, that is connected to the main section 74 and allows for force exerted on the connection bar 80 to be transferred to the main section 74 and connected pinch wheels 58 since the pneumatic cylinder 56, as shown, is fixedly attached to the mounting body 52.

The axle assembly 72 can also include a pair of axle arms 82 connected to the main section 74 and pivotally connected to the mounting body 52 by a pivot pin 84 extending through openings 86 formed in each plate 66 of the mounting body 52, with the pivot pin 84 defining a pivot point on the mounting body 52 that the axle arms 82 can pivot about. The axle arms 82 can be laterally spaced apart so that each axle arm 82 is adjacent to one of the pinch wheels 58 and helps limit relative lateral movement of the pinch wheels 58 as the row unit 24 is carried across the field. As the axle arms 82 can pivot about the pivot pin 84 and are connected to the main section 74, the axle arms 82 allow the pinch wheels 58 to pivot about the pivot pin 84 as the row unit 24 is carried across the field. Force applied to the axle assembly 72 by the pneumatic cylinder 56 can therefore cause or prevent pivoting of the pinch wheels 58 about the pivot pin 84 so that an amount of down force exerted on the pinch wheels 58 toward the ground can be controlled. While two separate axle arms 82 are shown as connected to the main section 74 and pivot pin 84, it is contemplated that a single axle arm can take the place of the two separate axle arms 82.

Figure 5:
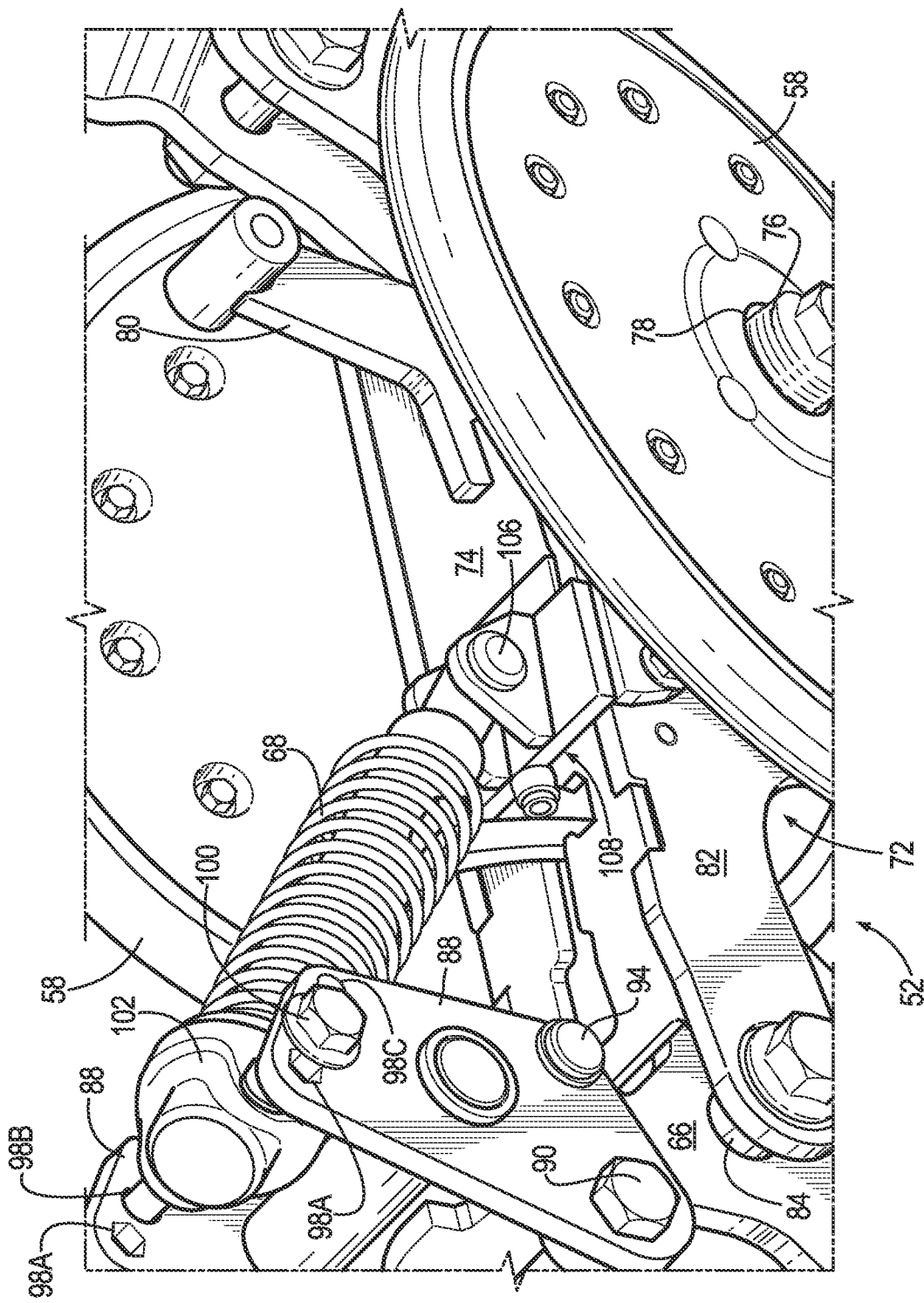
FIG. 5 is a perspective view of the closing assembly shown in FIGS. 2-4 with a compression spring shown as the biasing element.

Referring now to FIG. 5, the closing assembly 52 shown in FIGS. 2-4 is illustrated with the compression spring 68 as the biasing element, rather than pneumatic cylinder 56, connected to the mounting body 52 and axle assembly 72. Unlike the pneumatic cylinder 56 shown in FIGS. 2-4, the compression spring 68 is not shown as being connected directly to the mounting body 52, but can be connected to a pair of connection plates 88 that are attached to the mounting body 52. As can be seen in FIG. 5, the connection plates 88, which can together form a pushing mount section, can be connected to the mounting body 52 by bolts 90 extending through openings 92 (shown in FIG. 4) formed in the mounting body 52 as well as pins 94 extending through the openings 61 formed in the mounting body 52 where the pneumatic cylinder 56 was shown as being connected to the mounting body 52 in FIGS. 2-4, allowing for easy biasing element conversion from the pneumatic cylinder 56 to the compression spring 68. The connection plates 88 can each have adjustment openings 98A, 98B, and 98C, which can also be referred to as mounting features, formed through that can be aligned to allow for a spring bolt 100 to extend through an opening (not seen) formed in an end 102 of the compression spring 68 and aligned adjustment openings, such as adjustment openings 98B shown in FIG. 5, to connect the compression spring 68 to the connection plates 88. While the mounting features of the connection plates 88 are shown as adjustment openings 98A, 98B, and 98C, it should be appreciated that other mounting features can be included on the connection plates 88 to connect the compression spring 68 to the mounting body 52 and that the adjustment openings 98A, 98B, and 98C can also be formed in the plates 66 of the mounting body 52. As can be seen, the connection plates 88 can be angled relative to the mounting body 52 such that the adjustment openings 98A, 98B, and 98C are vertically above the pivot pin 84 so the compression spring 68 can exert downward force on the axle assembly 72. The adjustment openings 98A, 98B, and 98C can be formed in the connection plates 88 so that each of the adjustment openings 98A, 98B, and 98C has a different vertical height relative to the pivot pin 84, allowing for varying amounts of downward force to be exerted on the axle assembly 72 by the compression spring 68 by adjusting which adjustment openings 98A, 98B, or 98C is used to connect the compression spring 68 to the connection plates 88. The compression spring 68 can have another end 106 opposite the end 102 that is connected to a compression spring connector 108, which can also be referred to as a biasing connection feature, which is bolted to one or both axle arms 82, connecting the compression spring 68 to the main section 74 of the axle assembly 72 and allowing the down force produced by the compression spring 68 to be exerted on the pinch wheels 58.

Figure 6:
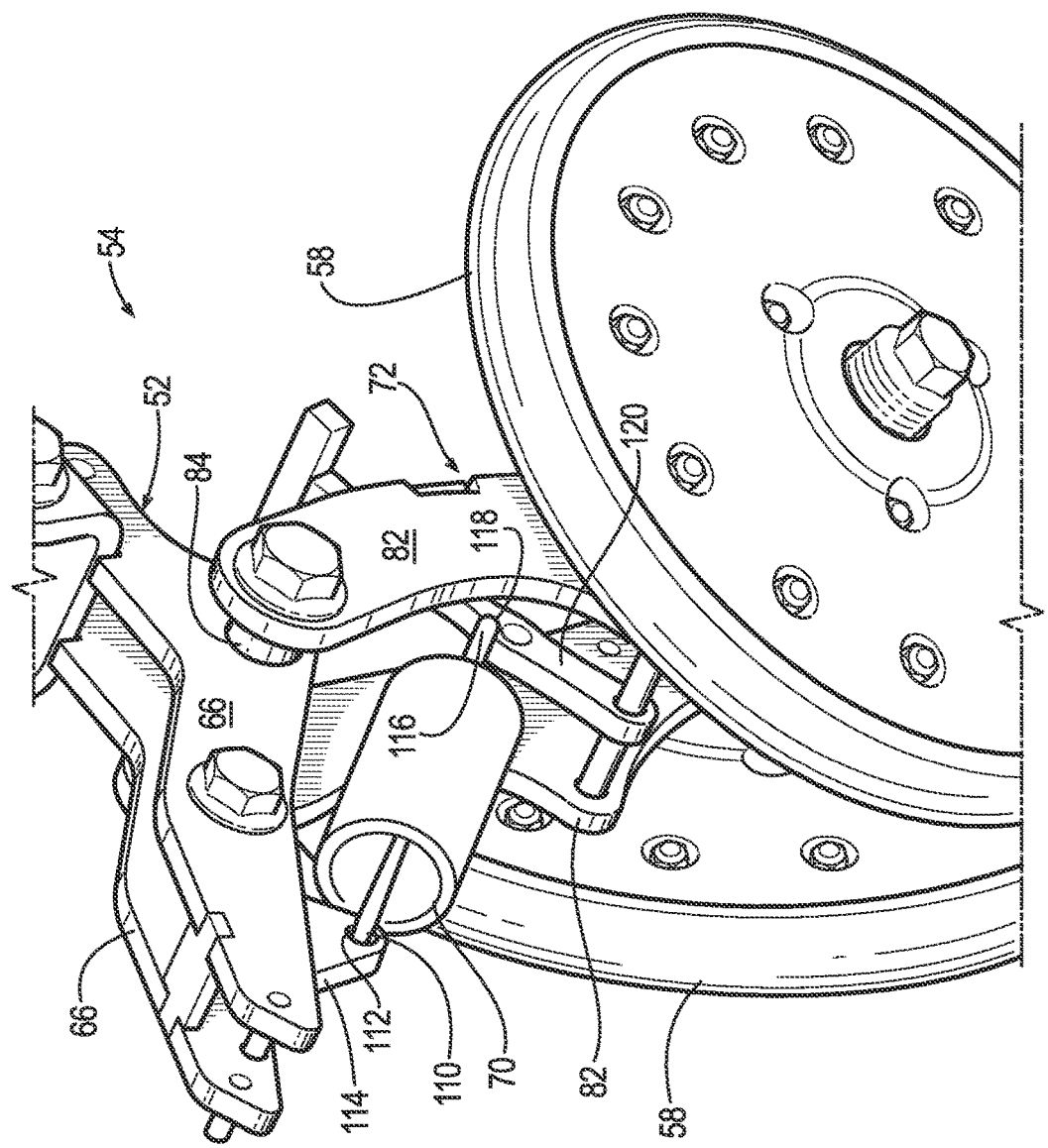
FIG. 6 is a perspective view of the closing assembly shown in FIGS. 2-5 with an extension spring shown as the biasing element.

Referring now to FIG. 6, the closing assembly 54 is shown with the extension spring 70 as the biasing element connected to the axle assembly 72, rather than pneumatic cylinder 56 or compression spring 68. As can be seen, the extension spring 70 can have a first end 110 held in an opening 112, which can be referred to as a mounting feature, formed in a connecting tab 114, which can also be referred to as a pulling mount section, that is attached to the mounting body 52 and a second end 116 held in an opening 118 of an extension bar 120, which can also be referred to as a biasing connection feature, that is connected to the axle arms 82 of the axle assembly 72. This configuration allows tension from the extension spring 70 to pull the extension bar 120 toward the connecting tab 114, which will also pull the axle arms 82, main section 74, and pinch wheels 58 toward the connecting tab 114 due to interconnections between the elements. While the extension spring 70 is shown as being connected to the connecting tab 114 attached to the mounting body 52, the extension spring 70 can also be directly connected to the mounting body 52 or elsewhere in the row unit 24 such that it can apply a down force to the axle assembly 72 and connected pinch wheels 58. Since the force applied to the pinch wheels 58 by the extension spring 70 is a tensile force, the extension spring 70 should have its first end 110, which is not connected to the axle assembly 72, held below the pivot pin 84 so the tensile force applied to the axle assembly 72 is directed in a downward direction toward the field as the row unit 24 is carried across the field. It should be appreciated that any type of extension spring can be used as extension spring 70 and the end of the extension spring that is not connected to the axle assembly 72 can be held in a variety of adjustable positions to change the amount of down force that the extension spring 70 applies to the axle assembly 72.

Taken together, it should be apparent that the axle assembly 72 connected to the pinch wheels 58 can convertibly and readily connect to the various biasing elements 56, 68 and 70 described herein with few, if any, modifications to the closing assembly 54 necessary to accommodate connection to the various biasing elements 56, 68 and 70. This allows for the closing assembly 54 to readily incorporate all three types of biasing elements 56, 68 and 70 to provide down force to the pinch wheels 58 without changing the axle assembly 72 connecting the pinch wheels 58.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural planting apparatus, comprising:
    a chassis;
    a row unit carried by the chassis, the row unit including:
        a unit body carried by the chassis;
        a metering device carried by the unit body;
        at least one furrowing disc carried by the unit body;
        a biasing element carried by the unit body, the biasing element being selected from the group consisting of an extension spring, a compression spring, and a cylinder;
        a pair of pinch wheels carried by the unit body behind the at least one furrowing disc and including an axle assembly pivotally movable relative to the unit body and connected to the biasing element, the axle assembly being configured to readily connect to any of the group members of the biasing element;
        a mounting body carried by the unit body, the biasing element being connected to the mounting body and the axle assembly being pivotally connected to the mounting body, the mounting body including a first mounting feature configured to connect to the extension spring, a second mounting feature configured to connect to the compression spring, and a third mounting feature configured to connect to the cylinder, and the mounting body also including a pulling mount section and a pushing mount section, the first mounting feature being located on the pulling mount section and the second mounting feature being located on the pushing mount section,
    wherein the pushing mount section is a pair of plates adjustably connected to the mounting body with a space formed therebetween.

2. The planting apparatus according to claim 1, wherein at least one of the plates has an opening formed therein defining the second mounting feature.

3. The planting apparatus according to claim 2, wherein one of the plates has a first opening formed therein and the other of the plates has a second opening formed therein that is aligned with the first opening, the first opening and the second opening defining the second mounting feature.

4. The planting apparatus according to claim 1, wherein the axle assembly includes a main section connected to the pair of pinch wheels and at least one arm pivotally connecting the main section to the mounting body.

5. The planting apparatus according to claim 1, wherein the axle assembly includes a main section connected to the pair of pinch wheels, the main section including at least one biasing connection feature formed thereon configured to connect to the biasing element.

6. The planting apparatus according to claim 5, wherein the main section includes three biasing connection features, each of the biasing connection features being configured to connect to one of the group members of the biasing element.

7. The planting apparatus according to claim 5, wherein the axle assembly includes a pair of arms connected to the main section and configured to pivotally move the main section relative to the unit body.

8. A closing assembly for an agricultural planting apparatus, comprising:
    a mounting body including a first mounting feature configured to connect to the extension spring, a second mounting feature configured to connect to the compression spring, and a third mounting feature configured to connect to the cylinder, and the mounting body also including a pulling mount section and a pushing mount section, the first mounting feature being located on the pulling mount section and the second mounting feature being located on the pushing mount section, wherein the pushing mount section is a pair of plates adjustably connected to the mounting body with a space formed therebetween;
    a biasing element connected to said mounting body, the biasing element being selected from the group consisting of an extension spring, a compression spring, and a cylinder; and
    a pair of pinch wheels including an axle assembly pivotally connected to the mounting body and connected to the biasing element, the axle assembly being configured to readily connect to any of the group members of the biasing element.

9. The closing assembly according to claim 8, wherein the axle assembly includes a main section connected to the pair of pinch wheels, the main section including at least one biasing connection feature formed thereon configured to connect to the biasing element.

10. The closing assembly according to claim 9, wherein the main section includes three biasing connection features, each of the biasing connection features being configured to connect to one of the group members of the biasing element.

11. The closing assembly according to claim 9, wherein the axle assembly includes a pair of arms connected to the main section and pivotally connected to the mounting body.

* * * * *